US012438813B2

(12) United States Patent
Ageneau et al.

(10) Patent No.: US 12,438,813 B2
(45) Date of Patent: Oct. 7, 2025

(54) TECHNIQUES FOR NETWORK CONGESTION CONTROL

(71) Applicant: NETFLIX, INC., Los Gatos, CA (US)

(72) Inventors: Paul-Louis Serge Daniel Ageneau, Amsterdam (NL); Mark Watson, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 57 days.

(21) Appl. No.: 18/448,830

(22) Filed: Aug. 11, 2023

(65) Prior Publication Data

US 2025/0055796 A1 Feb. 13, 2025

(51) Int. Cl.
*H04L 47/12* (2022.01)
*H04L 47/11* (2022.01)
*H04L 47/25* (2022.01)

(52) U.S. Cl.
CPC .............. *H04L 47/12* (2013.01); *H04L 47/11* (2013.01); *H04L 47/25* (2013.01)

(58) Field of Classification Search
None
See application file for complete search history.

(56) References Cited

U.S. PATENT DOCUMENTS 9,319,321 B2 * 4/2016 Funge .................. H04L 67/02
9,473,406 B2   10/2016 Penner et al.
11,677,670 B2 * 6/2023 Liu ..................... H04L 47/283
                                                        370/458
2021/0330277 A1 * 10/2021 Scott ..................... A61B 6/542
2023/0103418 A1 *  4/2023 Ma .................... H04W 28/0263
                                                        370/329

FOREIGN PATENT DOCUMENTS

WO   WO-2018069754 A1 *  4/2018 ......... H04L 41/0816
WO     2023/196227 A1   10/2023

OTHER PUBLICATIONS

International Search Report for Application No. PCT/US2024/041098 dated Oct. 29, 2024.

* cited by examiner

*Primary Examiner* — Quang N Nguyen
(74) *Attorney, Agent, or Firm* — Artegis Law Group, LLP

(57) ABSTRACT

In various embodiments, a congestion control module within a transport stack limits the rate at which packets are transmitted from a server to a client device based on a percentage of the available capacity of a network path through which the packets are transmitted. In some embodiments, the available network path capacity can be determined by first performing a linear regression using (1) send durations over which packets associated with encoded frames are transmitted, and (2) corresponding reception durations over which the packets associated with the encoded frames are received, in order to determine a line that relates send duration and reception duration. After the line is determined, the available network path capacity can be computed as an estimated intersection between the determined line and the line y=x, with the intersection being approached as a limit.

20 Claims, 8 Drawing Sheets

TECHNIQUES FOR NETWORK CONGESTION CONTROL

BACKGROUND

Field of the Invention

Embodiments of the present disclosure relate generally to computer science and computer networking and, more specifically, to techniques for network congestion control.

Description of the Related Art

In computer networking, packets of data are transmitted through a series of interconnected devices (also referred to herein as "nodes" or "network nodes"), such as routers and switches, from a source computer to a destination computer. For example, to transmit a video over a network, each frame of the video could be encoded at the source computer, and the encoded frame could then be split into data packets that are transmitted from the source computer through a number of network nodes to the destination computer.

Network congestion occurs when a link or a node within a network is receiving more packet traffic than the link or node can handle. Network congestion can cause packets being transmitted through the network to be queued and delayed, or can even result in packets being dropped and failing to reach a desired destination computer.

For real-time applications, such as telephony, videoconference, cloud gaming, or telepresence, the typical approach for mitigating the effects of network delay variability, notably caused by congestion, is for a destination computer to store received packets temporarily in a jitter buffer and then play back the buffered packets at a constant rate. Buffering received packets gives delayed packets an opportunity to arrive at the destination computer and then be played back along with other packets that have not been delayed. One drawback of buffering packets in this fashion is that storing received packets in a jitter buffer and then playing back the stored packets can introduce playback delay. Interactive real-time applications, such as cloud gaming or telepresence applications, require the shortest possible delay and cannot tolerate the playback delay caused by buffering packets, as the user can experience the delay as a slow reaction time to their control instructions.

An approach for avoiding network congestion is for the source computer to send packets at a low enough rate to not cause network congestion, which is also sometimes referred to as "congestion control." One conventional congestion control technique involves slowly increasing the rate at which the source computer transmits packets to probe the network path until network congestion is detected, for instance through packet delay or loss. When network congestion is detected, the rate at which the source computer transmits packets is reduced until the network congestion is resolved. Once resolved, the rate at which the source computer transmits packets is increased slowly once again. This process repeats throughout the given network session. One drawback of this type of congestion control technique is that short network congestion events need to be triggered for distinct congestion signals to be measured and their effects have to be mitigated, in particular delay variation with a jitter buffer. Another drawback is that the rate at which the source computer transmits packets oftentimes is increased too slowly for applications that require a high bitrate. Further, when transmitting frames of video data using this type of congestion control technique, an encoder is required to encode the frames of video data at particular bitrates to allow the packets generated from those frames to be transmitted at the desired rates when slowly increasing the transmission rate until network congestion is detected. Notably, though, the encoder may not always be able to achieve the particular encoding bitrates needed to implement the desired transmission rates.

As the foregoing illustrates, what is needed in the art are more effective techniques for mitigating network congestion.

SUMMARY OF THE EMBODIMENTS

One embodiment of the present disclosure sets forth a computer-implemented method for controlling network congestion. The method includes receiving feedback information indicating one or more reception durations over which a plurality of first packets from one or more first groups of packets were received by a client device. The method further includes computing a first relationship between send duration and reception duration based on the one or more reception durations and one or more send durations over which the plurality of first packets were transmitted to the client device. In addition, the method includes computing an available network path capacity based on the first relationship, and causing data associated with one or more second packets to be encoded at a particular bitrate based on the available network path capacity.

Other embodiments of the present disclosure include, without limitation, one or more computer-readable media including instructions for performing one or more aspects of the disclosed techniques as well as a computing device for performing one or more aspects of the disclosed techniques.

At least one technical advantage of the disclosed techniques relative to the prior art is that the disclosed techniques do not require buffering packets and, therefore, do not cause playback delay when packets are being played back. In addition, the disclosed techniques can adapt the transmission rate faster than conventional congestion control techniques. In particular, the disclosed techniques can reach the maximum bitrate after only a few measurements for applications that require high bitrate, while avoiding packet delay and loss. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

As described, conventional congestion control techniques rely on triggering short network congestion events and need mitigations for real-time applications like buffering packets in a jitter buffer. However, interactive real-time applications require the shortest transmission delay and cannot tolerate the playback delay caused by buffering packets in a jitter buffer. Further, in conventional congestion control techniques, the rate at which packets are transmitted can be increased too slowly for applications that require high bitrate. In addition, when the frames of a video are being transmitted, conventional congestion control techniques require an encoder to encode the frames at particular bitrates, which the encoder may not always be able to achieve.

The disclosed techniques control network congestion by limiting the rate at which packets are transmitted from a server to a client device. In some embodiments, a congestion control module within a transport stack of the server limits the rate at which packets are transmitted based on a percentage of the available capacity of a network path through which the packets are transmitted. In such cases, the available network path capacity can be computed by first performing a linear regression using (1) send durations over which packets associated with encoded frames were transmitted, and (2) corresponding reception durations over which the packets associated with the encoded frames were received, in order to determine a line that relates send duration (x) and reception duration (y). After the line is determined, the available network path capacity can be computed as an estimated intersection between the determined line and the line y=x, with the intersection being approached as a limit.

Although described herein with respect to packets associated with encoded frames as a reference example, in some other embodiments, the unit of measurement with respect to which send and reception durations are measured can be any suitable group of packets, such as the packets associated with a frame, a group of frames, a part of a frame, or something else (e.g., when a real-time media other than video, such as a real-time virtual reality, is transmitted).

Advantageously, the disclosed techniques address various limitations of conventional approaches for mitigating network congestion. More specifically, the disclosed techniques do not require a jitter buffer and, therefore, do not cause playback delay when packets are being played back. In addition, the disclosed techniques can adapt the transmission rate faster than conventional congestion control techniques. In particular, the disclosed techniques can reach the maximum bitrate after only a few measurements for applications that require high bitrate, while avoiding packet delay and loss.

System Overview

Figure 1:
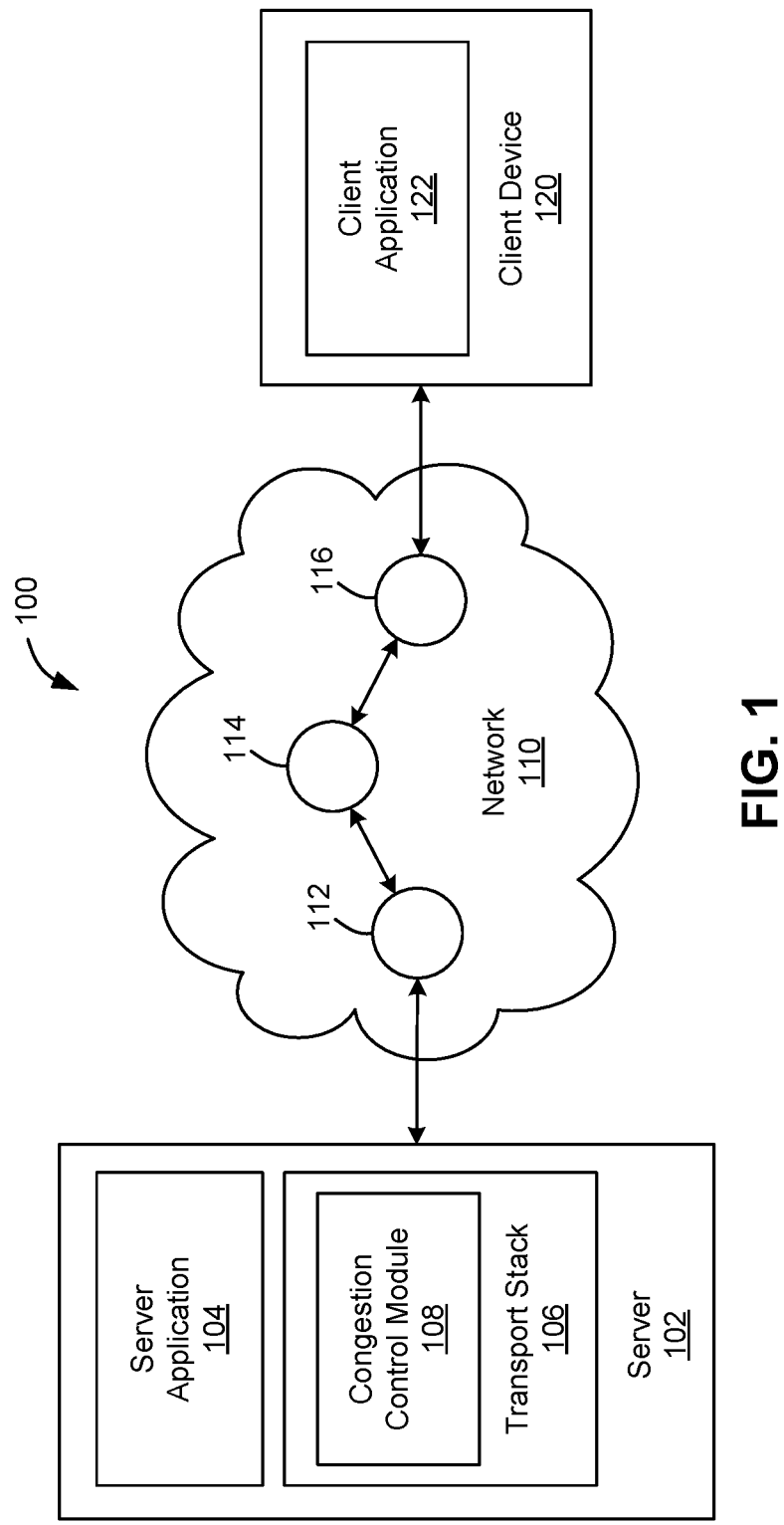
FIG. 1 is a conceptual illustration of a system that is configured to implement one or more aspect of the various embodiments.

FIG. 1 is a conceptual illustration of a system 100 that is configured to implement one or more aspects of the various embodiments. As shown, the system 100 includes a server 102 and a client device 120 that communicate over a network 110, such as the Internet. Illustratively, communication between the server 102 and the client device 120 traverses a network path that includes a number of nodes, shown as nodes 112, 114, and 116. Each of the nodes 112, 114, and 116 can be a router or a switch in some embodiments.

A server application 104 running in the server 106 serves data to a client application 122 running in the client device 120. For example, in some embodiments, the server application 104 can be a cloud gaming application that serves video and audio data for a gaming session and receives user inputs from the client application 122. More generally, a server application, such as the server application 104, can serve any suitable data to one or more client applications. For example, in some other embodiments, the server application can be a telephone, videoconference, telepresence (e.g., a camera filming an operation performed remotely), virtual reality, musical collaboration, or real or virtual device remote control application.

The client application 122 can be a web browser or any other technically feasible software application that is capable of interacting with the server application 104. Returning to the cloud gaming example, the client application 122 could be a dedicated application for playing cloud-based video games.

In order to control network congestion when the server application 104 is transmitting packets to the client application 122 over the network 110 (and over the network path that includes the nodes 112, 114, and 116 in particular), a congestion control model 108 in a transport stack 106 of the server 102 is configured to (1) determine an available capacity of the network path that includes the nodes 112, 114, and 116; and (2) cause an encoder to encode frames for transmission at a target bitrate based on a percentage of the available network path capacity, as discussed in greater detail below in conjunction with FIGS. 4-8. Doing so can ensure that the packets associated with encoded frames are able to arrive at the client device 120 in time for decoding with a comfortable safety margin, i.e., that packet delay and packet loss are avoided. In some embodiments, the congestion control model 108 can determine the available network path capacity by performing a linear regression using (1) send durations (x) over which packets associated with encoded frames are transmitted, and (2) corresponding reception durations (y) over which the packets associated with the encoded frames are received, in order to determine a line relating send duration and reception duration. In such cases, the congestion control model 108 can compute the available network path capacity as an estimated intersection between the determined line and the line y=x. In particular, the estimated intersection of the determined line with the line y=x can be approached as a limit, as discussed in greater detail below in conjunction with FIGS. 6 and 8. As described, while packets associated with encoded frames is used herein as a reference example, in some other embodiments, the unit of measurement with respect to which send and reception durations are measured can be any suitable group of packets, such as the packets associated with a frame, a group of frames, a part of a frame or something else (e.g., when a real-time media other than video, such as a real-time virtual reality, is transmitted).

For explanatory purposes only, one server 102, one client device 120, and three nodes 112, 114, and 116 of the network 110 are shown in FIG. 1. However, as persons skilled in the art will recognize, a system may generally include any number of servers, client devices, and network nodes, and the servers, client devices, and network nodes may run on one or more physical computing systems or virtual computing systems running in, e.g., a data center or cloud. Further, functionality of the servers, client devices, and network nodes may be distributed across any number of other computing devices, or functionality of any number of applications may be consolidated into a single application or subsystem.

Figure 2:
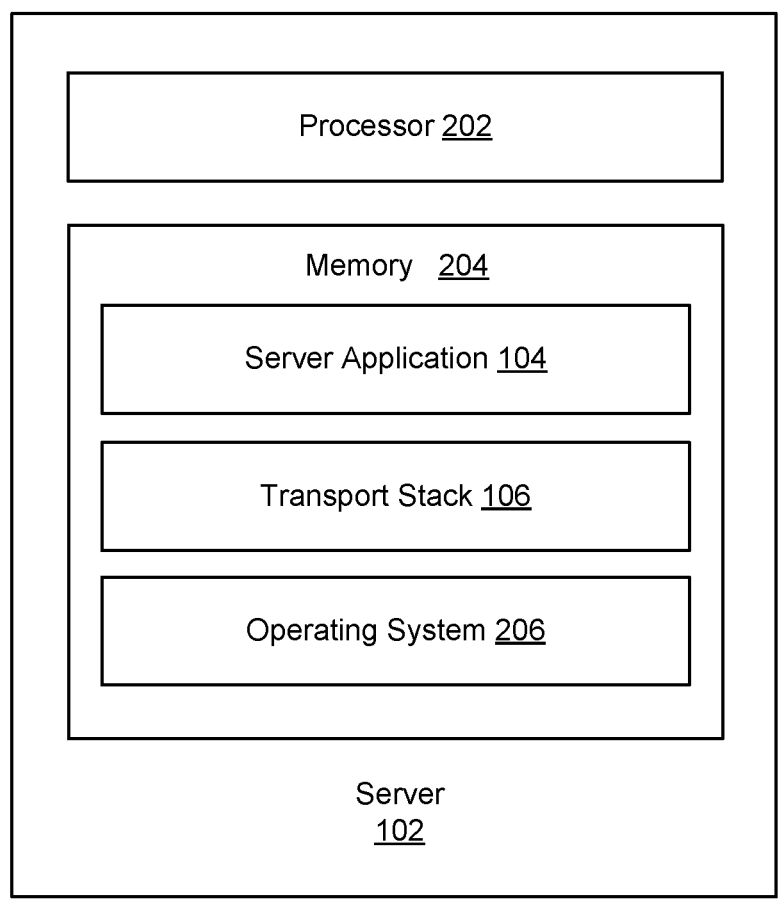
FIG. 2 is a more detailed illustration of the server of FIG. 1, according to various embodiments.

FIG. 2 is a more detailed illustration of the server 102 of FIG. 1, according to various embodiments. As shown, the server 102 includes, without limitation, a processor 202 and a memory 204. The processor 202 can be any instruction execution system, apparatus, or device capable of executing instructions. For example, the processor 202 could comprise a central processing unit (CPU), a graphics processing unit (GPU), a controller, a microcontroller, a state machine, or any combination thereof. The memory 204 stores content, such as software applications and data, for use by the processor 202.

The memory 204 can be one or more of a readily available memory, such as random access memory (RAM), read only memory (ROM), floppy disk, hard disk, or any other form of digital storage, local or remote. In some embodiments, a storage (not shown) may supplement or replace the memory 204. The storage may include any number and type of external memories that are accessible to the processor 202. For example, and without limitation, the storage may include a Secure Digital Card, an external flash memory, a portable compact disc read-only memory (CD-ROM), an optical storage device, a magnetic storage device, or any suitable combination of the foregoing.

As shown, the memory 204 stores the server application 104, the transport stack 106, and an operating system 206 on which the server application 104 and the transport stack 106 run. The operating system 206 may be, e.g., Linux®, Microsoft Windows®, or Android™. Each of the server application 104 and the transport stack 106 can be a service, application, or other type of software that runs on or is included in the operating system 206. Functionality of the server application 104 and the transport stack 106 can also be distributed across multiple pieces of software in some embodiments.

Figure 3:
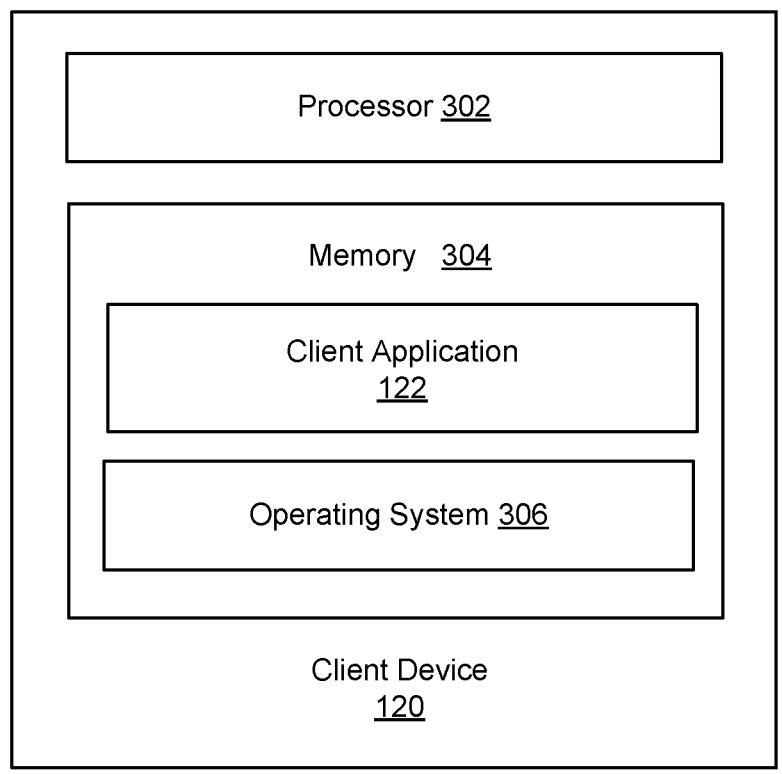
FIG. 3 is a more detailed illustration of the client device of FIG. 1, according to various embodiments.

FIG. 3 is a more detailed illustration of the client device 120 of FIG. 1, according to various embodiments. As shown, the client device 120 includes a processor 302 and a memory 304, which may perform similar functionalities as the processor 202 and the memory 204, respectively, of the server 102 described above in conjunction with FIG. 2. In some embodiments, a storage (not shown) may supplement or replace the memory 304. As shown, the memory 304 stores the client application 122 that is in communication with the server application 104 via the network 110 and an operating system 306 on which the client application 122 runs, which in some embodiments can be similar to the operating system 206 described above in conjunction with FIG. 2.

Network Congestion Control

Figure 4:
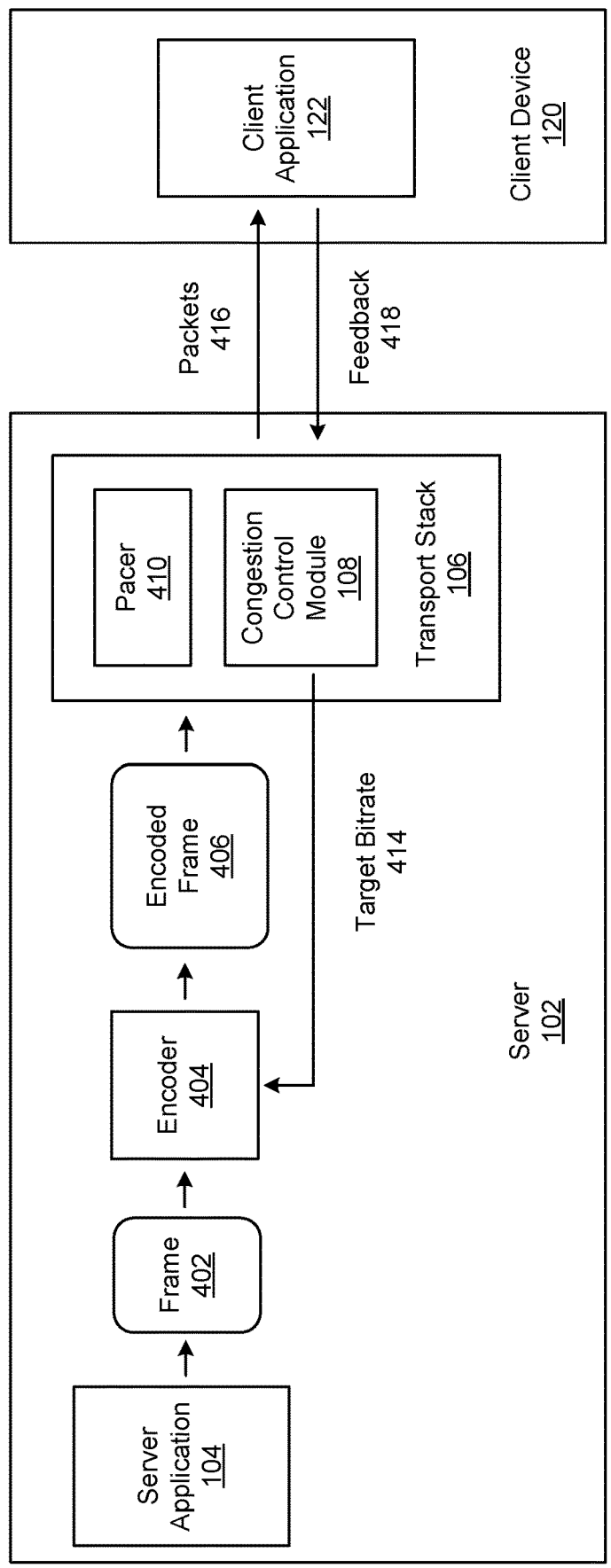
FIG. 4 illustrates how the congestion control module of FIG. 1 controls network congestion, according to various embodiments.

FIG. 4 illustrates how the congestion control module of FIG. 1 controls network congestion, according to various embodiments. As shown, the server 102 includes the server application 104, an encoder 404, and the transport stack 106. In operation, the server application 104 generates frames, shown as frame 402, that are transmitted to the client application 122. For example, the server application 104 could be a cloud gaming application that generates the frames of a video game and transmits the frames in real time to the client application 122. In such cases, the real time transmission can require that the frames be transmitted in the shortest achievable amount of time, which is oftentimes no more than a few tens of milliseconds (ms). Although sometimes described herein with respect to cloud gaming applications as a reference example of real-time applications, techniques disclosed herein can be used with any suitable applications, including other real-time application such as telephone, videoconference, telepresence (e.g., a camera filming an operation performed remotely), virtual reality, musical collaboration, and real or virtual device remote control applications. Some cloud gaming, telepresence, virtual reality, musical collaboration, and real or virtual device remote control applications can be highly interactive and are, therefore, more time-critical, as a user can perceive any input lag as a lack of responsiveness for actions/reactions, which users are generally very sensitive to. By contrast, for some "conversational" applications, such as phone/video conferencing applications, users can be relatively tolerant to delays, which appear as gaps between speakers.

The encoder 404 encodes frames to generate corresponding encoded frames. Illustratively, the encoder 404 encoded the frame 402 to generate an encoded frame 406. The encoder 404 can perform any technically feasible encoding operations, based on any suitable encoding parameters, in some embodiments. In particular, the encoder 404 can encode frames at a particular bitrate, which can correspond to a particular frame size of each encoded frame. The encoder 404 passes encoded frames, such as the encoded frame 406, to the transport stack 106 for transmission over a network, such as the network 110 described above in conjunction with FIG. 1.

The transport stack 106 provides end-to-end communication services for applications, including the server application 104. In particular, the transport stack packetizes encoded frames (e.g., encoded frame 406) and transmits the packets to client devices (e.g., client device 120). As shown, the transport stack 106 includes the congestion control module 108 and a pacer 410. The pacer 410 sends packets, into which each encoded frame is split, to the client application 122 in one or more bursts, over a variable send duration. In some embodiments, the variable send duration can be implemented as a variation to a pacer deadline by which the burst(s) of packets associated with each encoded frame need to have left the pacer 410. In such cases, the pacer 410 will send an encoded frame on a packet-by-packet basis (B=1) or on a burst-by-burst basis (B>1) so that the last packet is sent out just before the deadline is reached:

$$K_n = \left\lfloor \frac{|P_n| + B - 1}{B} \right\rfloor, \quad (1)$$

$$I_n = \left\lfloor \frac{T_s}{\max\{K_n, 2\}} \right\rfloor, \quad (2)$$

where $|P_n|$ is number of packets, B is the burst size in packets (an integer) and $T_s$ is the send duration over which the packets associated with an encoded frame are transmitted. At each time internal $I_n$, the pacer 410 transmits B packets from the queue, meaning the packet for an entire encoded frame can be transmitted under the $T_s$ send duration. In order to probe the available network path capacity, the target reception duration $T_r$ must be higher than the send duration $T_s$, thereby creating a positive feedback loop that can probe for higher and higher network path capacities until the network path bottleneck capacity is reached:

$$T_r > T_s. \qquad (3)$$

For example, when the frame period is $T_f = 1/30$ seconds, such as in the case of some cloud gaming applications, the send duration $T_s$ and the target reception duration $T_r$ can be set to $T_s=10$ ms and $T_r=2T_s=20$ ms, in which case the pacer 410 will attempt to pace at twice the target bitrate. $T_s$ is also the minimum reception time that can be measured at reception:

$$R_n \geq T_s, \qquad (4)$$
$$R_n > \frac{1}{2}T_r.$$

Accordingly, in this example, the network path capacity can be measured up to twice the previously estimated capacity, and the transmission rate can be increased multiplicatively until the network path capacity is reached, without risk of overshooting the network path capacity. In some other embodiments, different settings can be used to obtain different multiplicative bounds on the increase of transmission rate.

In some embodiments, the pacer 410 computes a variable send duration over which to send the packets for a given encoded frame by adding a random variation to an average send duration. In addition, in some embodiments, if the encoded frame 406 is smaller than the target size, then the pacer 410 reduces the send duration to compensate for the smaller encoded frame 406. Such a compensation is required because frames smaller than the target size would be transmitted at a pace that is slower than the pace at which frames matching the target size are transmitted. As a result of the slower pace of transmission, an available network path capacity can be measured as artificially lower and result in degraded quality when the content becomes more dynamic. By scaling down the send duration linearly to compensate for smaller frames, the sending rate of packets associated with the smaller frames are unaffected by the smaller sizes of the frames.

More formally, in some embodiments, the variable send duration, over which the packets for an encoded frame are sent, can be computed as:

$$\text{Send duration} = (T_s \pm \Delta) \times \min\left(\frac{\text{Frame size}}{\text{Target size}}, 1\right), \qquad (5)$$

where Ts is an average send duration, $\pm \Delta$ is a uniform random noise, and Frame size/Target size is the compensation ratio for when an encoded frame size is smaller than the target size. For example, if the uniform random noise is set to $\Delta=0.5T_s$, then with $T_s=10$ ms, the send duration will vary between 5 ms and 15 ms.

After encoded frames are sent to the client application 122, the congestion control module 108 receives, from the client application 122, feedback information indicating a reception duration for packets associated with each encoded frame. In some embodiments, the feedback information can specify (1) acknowledgements of packets that were received by the client application 122, and (2) timings of when the packets were received, which the client application 122 aggregates and transmits to the server 102 as feedback information.

The congestion control module 10 infers the current network condition and updates a target bitrate at which the encoder 404 encodes frames. In some embodiments, the target bitrate is updated to a fraction of the available network path capacity that can ensure that the packets associated with encoded frames can arrive at the client device 120 in time for decoding with a comfortable safety margin. To infer the current network condition and update the target bitrate of the encoder 404, the congestion control module 108 first computes the reception duration for packets associated with each encoded frame that was received by the client application 122 using the feedback information from the client application 122. After determining the reception duration for packets associated with each encoded frame, the congestion control module 108 performs a regression using the send duration and the reception duration associated with each encoded frame to determine a relationship between send duration and reception duration, e.g., a linear relationship relating send duration and reception duration. In some embodiments, the congestion control module 108 first normalizes the send duration and the reception duration per byte by dividing send durations and reception durations, respectively, by the frame size to give a normalized send duration and reception duration, respectively, and the congestion control module 108 then performs the regression using the normalized send duration and the normalized reception duration associated with each encoded frame that is transmitted to the client device 120.

In some embodiments in which a linear relationship (i.e., a line) is determined relating the send duration (x) and reception duration (y), the congestion control module 108 further determines an available network path capacity as an estimated intersection between the computed line and the line y=x, which is a linear relationship representing send duration and reception duration being equal. It should be understood that the available network path capacity is the capacity of a bottleneck node in the network path between the server 102 and the client device 120. In some embodiments, the congestion control module 108 computes an estimate of the available network path capacity by approaching the intersection of the determined line with the line y=x as a limit, as discussed in greater detail below in conjunction with FIGS. 6 and 8.

After computing the available network path capacity, the congestion control module 108 causes the encoder 404 to encode subsequent frames at a target bitrate based on a percentage of the available network path capacity. In some embodiments, the target bitrate can be set on the encoder 404 according to:

$$B_n = \frac{T_r}{T_f} C_n g(L_n), \qquad (6)$$

where $T_f$ is the frame period, $T_r$ is the target reception duration for a frame $T_r < T_f$, g is a discount function decreasing when the loss rate increases, for instance g: L→max{1−0.8L, 0.2}, and $L_n$ is a smoothed loss rate, which can be estimated as:

$$L_{n+1} = l_n + \exp\left(-\frac{\Delta_n}{\tau}\right)[L_n - l_n], L_0 = 0, \qquad (7)$$

where $l_n$=lost(n)/total(n) is a loss ratio reported in feedback from the client application 122, $\Delta_n = t_{n+1} - t_n$ is the elapsed time between updates, and r is the typical duration (e.g., 200 ms). The discount function for the loss rate is used to react temporarily but as fast as possible to network congestion. It should be noted that the entire network path capacity is not used, since as soon as more than the entire capacity is used, the reception duration will be higher than the frame period, which can induce delayed frames.

By setting the target bitrate according to equation (6), frames are given time to arrive at the client device 120 while keeping some leeway to accommodate for network variability and unexpected events. In addition, the target bitrate can converge relatively quickly based on the estimated available network path capacity, in contrast to conventional network congestion control techniques in which the rate at which a source computer transmits packets is increased slowly until network congestion is detected.

Figure 5:
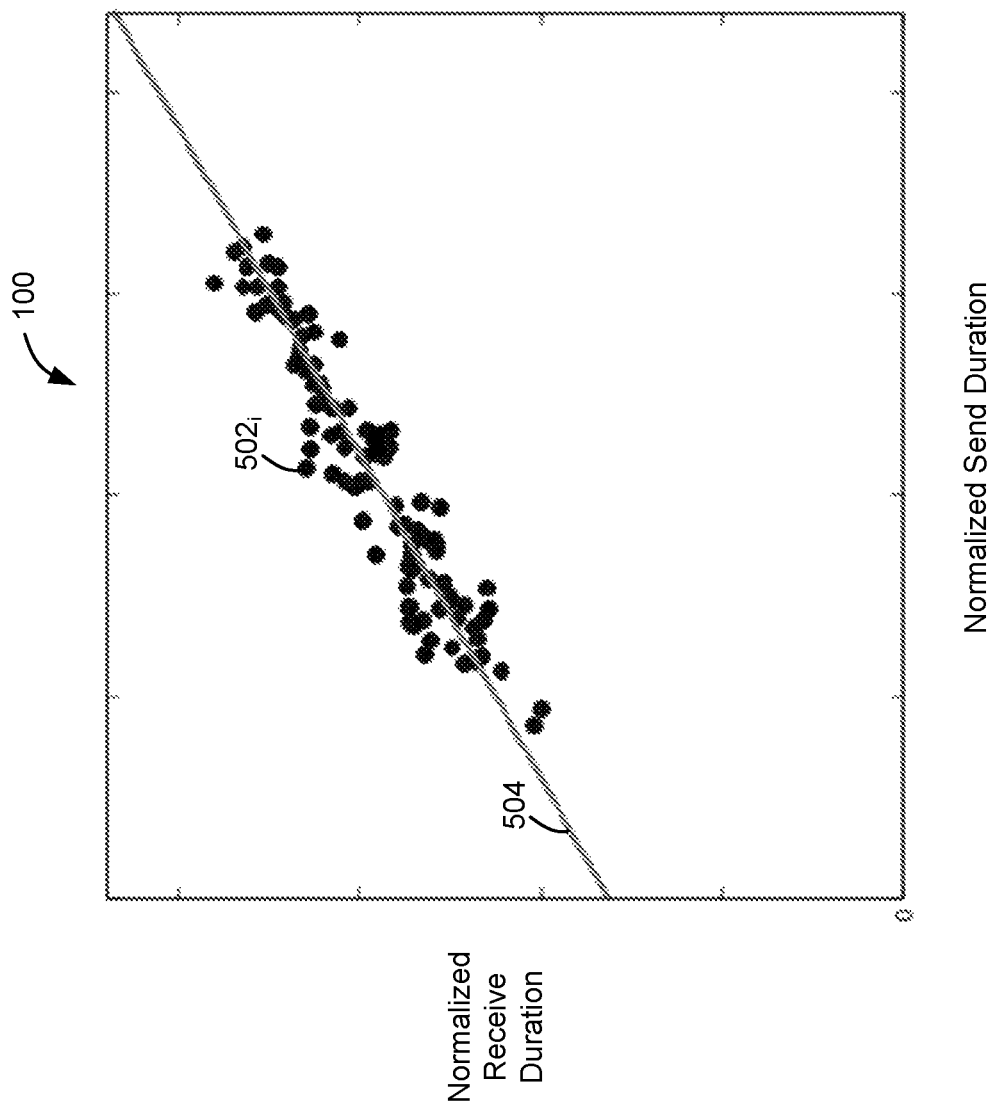
FIG. 5 illustrates an exemplar linear regression using packet send duration information and packet receive duration information, according to various embodiments.

FIG. 5 illustrates an exemplar linear regression using packet send duration information and packet receive duration information. As shown, given send duration data that is provided by the pacer 410 and receive duration data that is computed from feedback information provided by the client application 122, the congestion control module 108 normalizes the send duration data and the receive duration data to obtain normalized send duration data and normalized receive duration data, respectively:

$$r_n = \frac{R_n}{\sum_{i \in P_n} \text{Size}(i)}, \quad (8)$$

$$s_n = \frac{s_n}{\sum_{i \in P_n} \text{Size}(i)}.$$

The send duration data and the receive duration data are normalized per byte to account for frame sizes changing over time because of both target bitrate changes and encoder variability.

After normalizing the send duration data and the receive duration data, the congestion control module 108 performs linear regression to fit a line 504 to points 502$_i$ (referred to herein collectively as points 502 and individually as a point 502) of the form (normalized send duration, normalized receive duration). Notably, when packets are sent faster, for example back-to-back in a burst at the sender, the measured network path capacity will be closer to a total capacity of the network path, because the packets will be less affected by cross-traffic on the network path interleaving between the packets. By contrast, when packets are sent slowly, for example evenly paced over some period of time at the sender, the measured network path capacity will be closer to an available share of the capacity of the network path, because the packets can be affected by cross-traffic on the network path interleaving between the packets. More precisely, the proportion of cross-traffic packets that become interleaved with the sender traffic affects the reception duration so as to cause a linear dependency between send duration and reception duration. Graphically, an intercept 604 of the line 602 with the y-axis, which is denoted by $E_0$, corresponds to the normalized reception duration when sending an instant burst in which a frame is sent as a single burst, which is equal to 1/total capacity of the network path between the server 102 and the client device 120 if the bottleneck capacity is reached. In addition, an intercept 606 of the line 602 with identity, i.e., the line y=x 610, which is denoted by $E_1$, corresponds to a normalized reception duration when sending at the reception rate, meaning the packet flow uses its own network share, which can be used to estimate the available network path capacity as 1/available capacity of the network path. By performing a linear regression to determine the line 602, the congestion control module 108 can extrapolate what the reception duration (i.e., the total capacity or throughput) would be if packets were sent as fast as possible (i.e., the send duration is 0) and if packets were sent close to the reception rate, without actually sending packets as fast as possible or at the reception rate. In particular, the total capacity of a network path can be computed as $1/E_0$, and the available capacity of a network path can be computed as $1/E_1$. In particular, for a line given by y=ax+b with a<1, $E_1$ can be computed as $$E_1 = \frac{b}{1-a}.$$

In some embodiments, in order to determine the line 602 more efficiently than performing a linear regression, the congestion control module 108 can compute the linear coefficients with an exponentially weighted moving average (EWMA) process. It should be noted that the EWMA can be computed online using new send and reception durations, which is less computationally expensive than storing send and reception durations and then performing a full-fledged linear regression using the stored send and reception durations. More formally, for a line given by y=ax+b, since Cov(x,y)=Cov(x,ax+b)=aCov(x,x)=aVar(x), $$a = \frac{\text{Cov}(x, y)}{\text{Var}(x)}$$

and b=Avg(y)−aAvg(x). Accordingly, the linear coefficients a and b can be estimated by leveraging the EWMA process to also estimate Avg(x), Var(x), and Cov(x,y).

Figure 6:
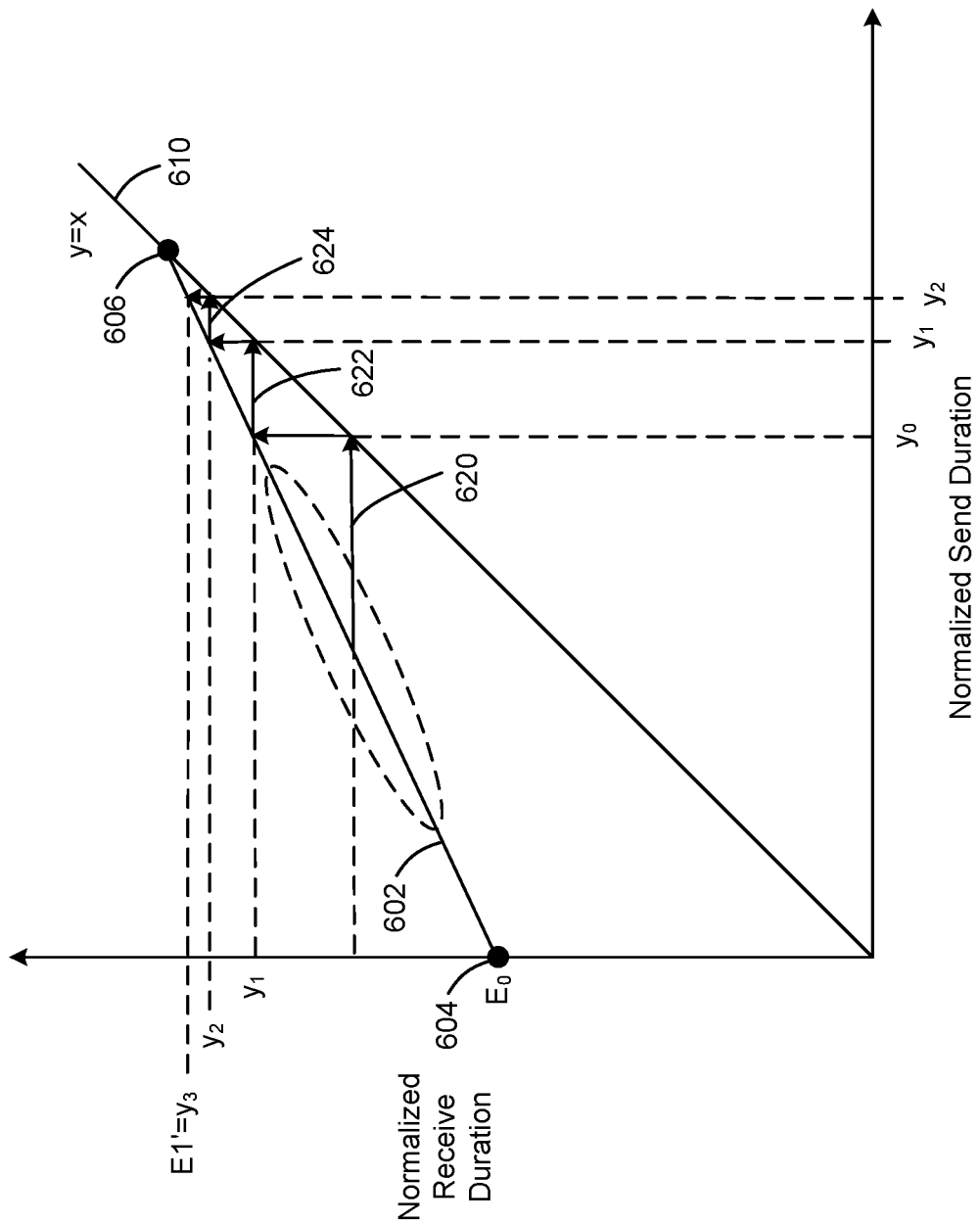
FIG. 6 illustrates how to compute an estimated network path capacity, according to various embodiments.

FIG. 6 illustrates how to compute an estimated network path capacity, according to various embodiments. As shown, in some embodiments, the congestion control module 108 computes an estimate of the available network path capacity by approaching the intersection 606 of the line 602 that relates the normalized send duration (x) to the normalized reception duration (y) with the line y=x 610 as a limit. Approaching the intersection with the line y=x 610 as a limit is beneficial when the slope of the line 602 is close to or equal to 1, such as during ramp-up when the reception duration is substantially equal to the send duration. In such cases, the line 602 may not intersect the line y=x 610, meaning that $$E_1 = \frac{b}{1-a}$$

becomes undefined. Approaching the intersection as a limit is robust to such cases.

To approach the intersection 606 of the line 602 with the line y=x 610 as a limit, the congestion control module 108 first sets the send duration to an average reception duration. Then, the congestion control module 108 iteratively (1) computes a reception duration associated with the set send duration, and (2) sets the send duration to the computed reception duration, with the congestion control module 108 returning at each iteration to compute another reception duration associated with the set send duration. For example, in some embodiments, the congestion control module 108 can iterate for a few (for example three or four) iterations in which steps (1) and (2), described above, are performed during each iteration. Then, the congestion control module 108 can set the estimated available network path capacity to the last computed reception duration.

More formally, in some embodiments, the congestion control module 108 first sets the send duration to an average reception duration $$y_0 = \text{Avg}(y). \tag{9}$$

Then, the congestion control module 108 iteratively (1) computes a reception duration associated with the set send duration, and (2) sets the send duration to the computed reception duration, as follows:

$$y_{n+1} = ay_n + b. \tag{10}$$

It should be understood that the limit is the intersection $$y_n = \frac{b}{1-a} \text{ if } a < 0. \tag{11}$$

Further, the available network path capacity can be set as $$1/E1', \tag{12}$$

where $E1' = y_N$ and N is the number of iterations, shown as 3 iterations in FIG. 6.

Figure 7:
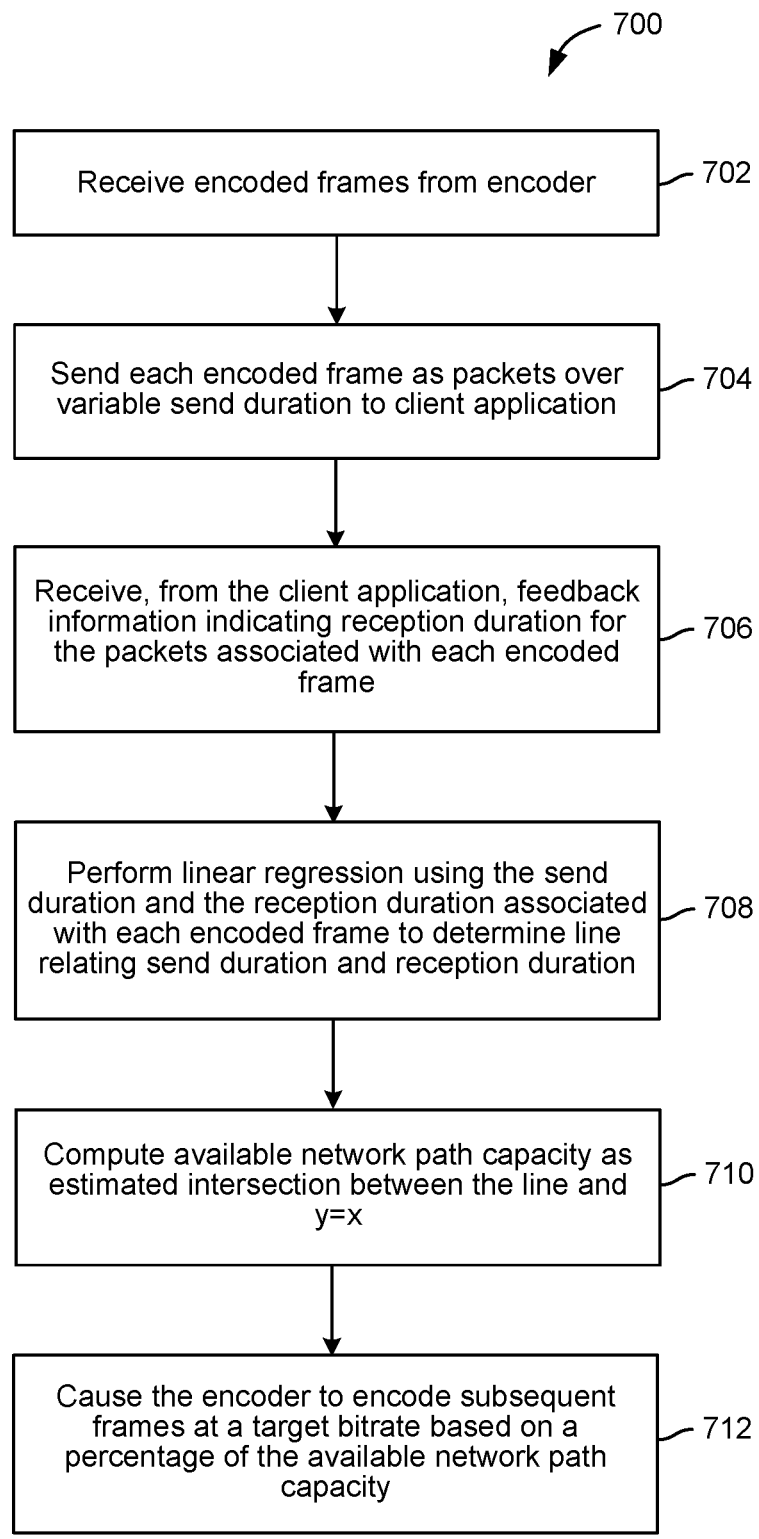
FIG. 7 is a flow diagram of method steps for controlling network congestion, according to various embodiments.

FIG. 7 is a flow diagram of method steps for controlling network congestion, according to various embodiments. Although the method steps are described with reference to the systems of FIGS. 1-4, persons skilled in the art will understand that any system configured to implement the method steps, in any order, falls within the scope of the present disclosure.

As shown, a method 700 begins at step 702, where the transport stack 106 receives encoded frames from the encoder 404. In some embodiments, the frames are generated by an application that provides real-time data, such as a cloud gaming application, and the encoder 404 encodes such frames to generate encoded frames. In some other embodiments, frames or other data can be generated by any technically feasible application, such as a telephone, videoconference, telepresence (e.g., a camera filming an operation performed remotely), virtual reality, musical collaboration, or real or virtual device remote control application.

At step 704, the pacer 410 of the transport stack 106 causes each encoded frame (or other data) to be transmitted as packets over a variable send duration to the client application 122. In some embodiments, the pacer 410 can compute the variable send duration over which to send the packets for a given encoded frame by adding a random variation to an average send duration, as described above in conjunction with FIG. 4.

At step 706, the congestion control module 108 receives, from the client application 122, feedback information indicating a reception duration for packets associated with each encoded frame (or other data). In some embodiments, the feedback information can specify (1) acknowledgements of packets that were received by the client application 122, and (2) timings of when the packets were received, which the congestion control module 108 can use to compute the reception duration for packets associated with each encoded frame.

At step 708, the congestion control module 108 determines a line relating send duration and reception duration using the send duration and the reception duration associated with each encoded frame. In some embodiments, the congestion control module 108 computes the linear coefficients with an EWMA online process, so as to avoid performing a more computationally expensive linear regression.

At step 710, the congestion control module 108 computes an available network path capacity as an estimated intersection between the line determined at step 708 and the line y=x. In some embodiments, the congestion control module 108 performs the step discussed in conjunction with FIG. 8 to compute an estimate of the available network path capacity by approaching the intersection of the line determined at step 708 with the line y=x as a limit.

At step 710, the congestion control module 108 causes the encoder 404 to encode subsequent frames at a target bitrate based on a percentage of the available network path capacity. Any other suitable percentage value can be chosen that enables the packets for encoded frames to arrive in time for decoding. In some embodiments, the target bitrate can be computed according to equation (6), described above in conjunction with FIG. 4.

Figure 8:
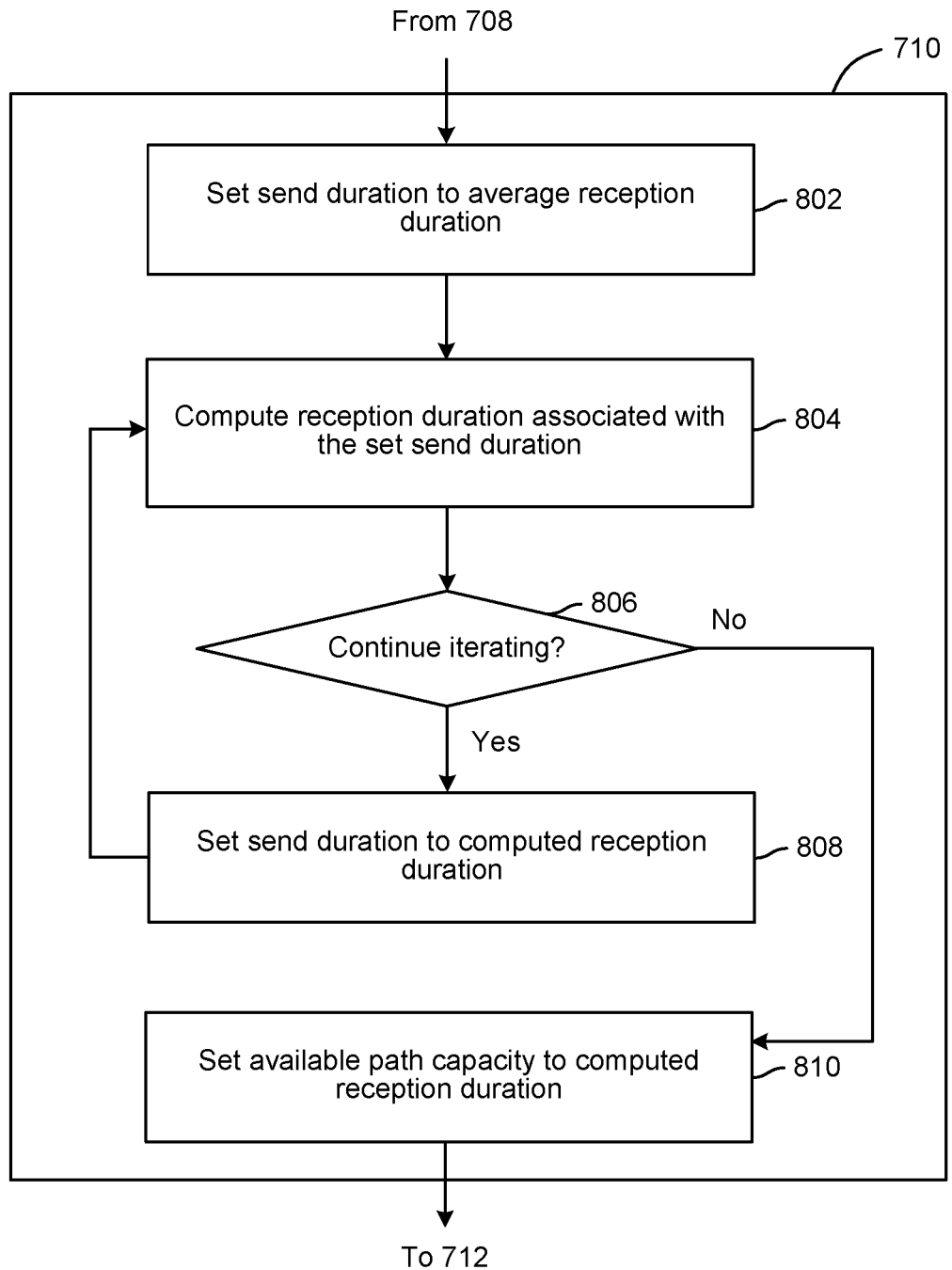
FIG. 8 is a flow diagram of method steps for computing an available network path capacity, according to various embodiments.

FIG. 8 is a flow diagram of method steps for computing an available network path capacity, according to various embodiments. Although the method steps are described with reference to the systems of FIGS. 1-4, persons skilled in the art will understand that any system configured to implement the method steps, in any order, falls within the scope of the present disclosure.

As shown, at step 802, the congestion control module 108 sets the send duration to an average reception duration. The average reception duration is an average of the reception durations associated with encoded frames, as indicated by the feedback information received from the client application 122.

At step 804, the congestion control module 108 computes a reception duration associated with the set send duration. The reception duration can be computed by inputting the set send duration into the function for the line determined at step 708, which outputs a corresponding reception duration, as described above in conjunction with FIG. 6.

At step 806, if the congestion control module 108 determines to continue iterating, then the method continues to step 808, where the congestion control module 108 sets the send duration to the computed reception duration. Then, the method returns to step 804, where the congestion control module 108 again computes a reception duration associated with the set send duration.

On the other hand, if the congestion control module 108 determines to stop iterating at step 806, the congestion control module 108 continues directly to step 810, where the congestion control module 108 sets the estimated available network path capacity to the computed reception duration.

At least one technical advantage of the disclosed techniques relative to the prior art is that the disclosed techniques do not rely on triggering network congestion and, therefore, do not require a jitter buffer and do not cause playback delay when packets are being played back. In addition, the disclosed techniques can adapt the transmission rate faster than conventional congestion control techniques. In particular, the disclosed techniques can reach the maximum transmission rate after only a few measurements for applications that require high bitrate, while avoiding packet delay and loss.

A further advantage of the disclosed techniques is the disclosed techniques provide for explicit sender visibility and control of the arrival time of each frame at the receiver, by adjusting the target reception duration that is used to calculate the send duration as described above. Doing so provides for sender management of the end-to-end delay, in contrast to prior art approaches in which the end-to-end delay is determined by whatever frame arrival time happens to occur. Sender management of the end-to-end delay is an advantage since the end-to-end delay can be traded against video quality in order to optimize the overall user experience for given network conditions. For example, when available throughput is very low, the sender may determine that longer end-to-end delay is an acceptable trade-off to avoid very low video quality. Alternatively, if available throughput is high, the sender may determine that video quality is already very high and reduction in the end-to-end delay is preferably to further increase the video quality. This is in contrast to prior art approaches that adjust only the video quality and leave end-to-end delay as an unmanaged aspect of the user experience.

These technical advantages represent one or more technological advancements over prior art approaches.

1. In some embodiments, a computer-implemented method for controlling network congestion comprises receiving feedback information indicating one or more reception durations over which a plurality of first packets from one or more first groups of packets were received by a client device, computing a first relationship between send duration and reception duration based on the one or more reception durations and one or more send durations over which the plurality of first packets were transmitted to the client device, computing an available network path capacity based on the first relationship, and causing data associated with one or more second groups of packets to be encoded at a particular bitrate based on the available network path capacity.

2. The computer-implemented method of clause 1, wherein the data associated with the one or more second group of packets is caused to be encoded at the particular bitrate based on a percentage of the available network path capacity.

3. The computer-implemented method of clauses 1 or 2, wherein the first relationship is a linear relationship.

4. The computer-implemented method of any of clauses 1-3, wherein computing the available network path capacity comprises performing one or more operations to estimate an intersection between the first relationship and a second relationship representing equal send duration and reception duration.

5. The computer-implemented method of any of clauses 1-4, wherein performing the one or more operations to estimate the intersection comprises, for each of one or more iterations setting a first send duration to an average of the one or more reception durations, and computing a first reception duration associated with the first send duration.

6. The computer-implemented method of any of clauses 1-5, wherein the feedback information specifies packets received by the client device and times at which the packets were received.

7. The computer-implemented method of any of clauses 1-6, wherein computing the first relationship comprises performing one or more operations to compute at least one coefficient with an exponentially weighted moving average (EWMA) process.

8. The computer-implemented method of any of clauses 1-7, wherein computing the first relationship comprises performing one or more linear regression operations based on the one or more reception durations and the one or more send durations.

9. The computer-implemented method of any of clauses 1-8, further comprising computing the one or more send durations based on an average send duration and one or more random variations, and causing the plurality of first packets to be transmitted to the client device based on the one or more send durations.

10. The computer-implemented method of any of clauses 1-9, wherein the one or more send durations are further computed based on a target size and sizes of the one or more first groups of packets.

11. In some embodiments, one or more non-transitory computer-readable media store instructions that, when executed by at least one processor, cause the at least one processor to perform steps for controlling network congestion, the steps comprising receiving feedback information indicating one or more reception durations over which a plurality of first packets from one or more first groups of packets were received by a client device, computing a first relationship between send duration and reception duration based on the one or more reception durations and one or more send durations over which the plurality of first packets were transmitted to the client device, computing an available network path capacity based on the first relationship, and causing data associated with one or more second groups of packets to be encoded at a particular bitrate based on the available network path capacity.

12. The one or more non-transitory computer-readable media of clause 11, wherein the data associated with the one or more second groups of packets is caused to be encoded at the particular bitrate based on a percentage of the available network path capacity.

13. The one or more non-transitory computer-readable media of clauses 11 or 12, wherein the first relationship is a linear relationship.

14. The one or more non-transitory computer-readable media of any of clauses 11-13, wherein computing the available network path capacity comprises performing one or more operations to estimate an intersection between the first relationship and a second relationship representing equal send duration and reception duration.

15. The one or more non-transitory computer-readable media of any of clauses 11-14, wherein performing the one or more operations to estimate the intersection comprises, for each of one or more iterations setting a first send duration to an average of the one or more reception durations, and computing a first reception duration associated with the first send duration.

16. The one or more non-transitory computer-readable media of any of clauses 11-15, wherein computing the first relationship comprises performing one or more operations to compute at least one exponentially weighted moving average (EWMA) coefficient.

17. The one or more non-transitory computer-readable media of any of clauses 11-16, wherein the instructions, when executed by the at least one processor, further cause the at least one processor to perform the steps of computing the one or more send durations based on an average send duration and one or more random variations, and causing the plurality of first packets to be sent to the client device based on the one or more send durations.

18. The one or more non-transitory computer-readable media of any of clauses 11-17, wherein the one or more first groups of packets and the one or more second groups of packets are generated for a server application that communicates in real time over a network path with a client application.

19. The one or more non-transitory computer-readable media of any of clauses 11-18, wherein the one or more first groups of packets and the one or more second groups of packets are associated with a plurality of encoded frames generated for a cloud gaming application.

20. In some embodiments, a system comprises a memory storing instructions, and a processor that is coupled to the memory and, when executing the instructions, is configured to perform the steps of receiving feedback information indicating one or more reception durations over which a plurality of first packets from one or more first groups of packets were received by a client device, computing a first relationship between send duration and reception duration based on the one or more reception durations and one or more send durations over which the plurality of first packets were transmitted to the client device, computing an available network path capacity based on the first relationship, and causing data associated with one or more second groups of packets to be encoded at a particular bitrate based on the available network path capacity.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling network congestion, the method comprising:
    receiving feedback information indicating one or more reception durations over which a plurality of first packets from one or more first groups of packets were received by a client device;
    computing a first relationship between send duration and reception duration based on the one or more reception durations and one or more send durations over which the plurality of first packets were transmitted to the client device;
    computing an available network path capacity based on the first relationship; and
    causing data associated with one or more second groups of packets to be encoded at a particular bitrate based on the available network path capacity.

2. The computer-implemented method of claim 1, wherein the data associated with the one or more second groups of packets is caused to be encoded at the particular bitrate based on a percentage of the available network path capacity.

3. The computer-implemented method of claim 1, wherein the first relationship is a linear relationship.

4. The computer-implemented method of claim 1, wherein computing the available network path capacity comprises performing one or more operations to estimate an intersection between the first relationship and a second relationship representing equal send duration and reception duration.

5. The computer-implemented method of claim 4, wherein performing the one or more operations to estimate the intersection comprises, for each of one or more iterations:
setting a first send duration to an average of the one or more reception durations; and
computing a first reception duration associated with the first send duration.

6. The computer-implemented method of claim 1, wherein the feedback information specifies packets received by the client device and times at which the packets were received.

7. The computer-implemented method of claim 1, wherein computing the first relationship comprises performing one or more operations to compute at least one coefficient with an exponentially weighted moving average (EWMA) process.

8. The computer-implemented method of claim 1, wherein computing the first relationship comprises performing one or more linear regression operations based on the one or more reception durations and the one or more send durations.

9. The computer-implemented method of claim 1, further comprising:
computing the one or more send durations based on an average send duration and one or more random variations; and
causing the plurality of first packets to be transmitted to the client device based on the one or more send durations.

10. The computer-implemented method of claim 9, wherein the one or more send durations are further computed based on a target size and sizes of the one or more first groups of packets.

11. One or more non-transitory computer-readable media storing instructions that, when executed by at least one processor, cause the at least one processor to perform steps for controlling network congestion, the steps comprising:
receiving feedback information indicating one or more reception durations over which a plurality of first packets from one or more first groups of packets were received by a client device;
computing a first relationship between send duration and reception duration based on the one or more reception durations and one or more send durations over which the plurality of first packets were transmitted to the client device;
computing an available network path capacity based on the first relationship; and
causing data associated with one or more second groups of packets to be encoded at a particular bitrate based on the available network path capacity.

12. The one or more non-transitory computer-readable media of claim 11, wherein the data associated with the one or more second groups of packets is caused to be encoded at the particular bitrate based on a percentage of the available network path capacity.

13. The one or more non-transitory computer-readable media of claim 11, wherein the first relationship is a linear relationship.

14. The one or more non-transitory computer-readable media of claim 11, wherein computing the available network path capacity comprises performing one or more operations to estimate an intersection between the first relationship and a second relationship representing equal send duration and reception duration.

15. The one or more non-transitory computer-readable media of claim 14, wherein performing the one or more operations to estimate the intersection comprises, for each of one or more iterations:
setting a first send duration to an average of the one or more reception durations; and
computing a first reception duration associated with the first send duration.

16. The one or more non-transitory computer-readable media of claim 11, wherein computing the first relationship comprises performing one or more operations to compute at least one exponentially weighted moving average (EWMA) coefficient.

17. The one or more non-transitory computer-readable media of claim 11, wherein the instructions, when executed by the at least one processor, further cause the at least one processor to perform the steps of:
computing the one or more send durations based on an average send duration and one or more random variations; and
causing the plurality of first packets to be sent to the client device based on the one or more send durations.

18. The one or more non-transitory computer-readable media of claim 11, wherein the one or more first groups of packets and the one or more second groups of packets are generated for a server application that communicates in real time over a network path with a client application.

19. The one or more non-transitory computer-readable media of claim 11, wherein the one or more first groups of packets and the one or more second groups of packets are associated with a plurality of encoded frames generated for a cloud gaming application.

20. A system, comprising:
a memory storing instructions; and
a processor that is coupled to the memory and, when executing the instructions, is configured to perform the steps of:
receiving feedback information indicating one or more reception durations over which a plurality of first packets from one or more first groups of packets were received by a client device,
computing a first relationship between send duration and reception duration based on the one or more reception durations and one or more send durations over which the plurality of first packets were transmitted to the client device,
computing an available network path capacity based on the first relationship, and
causing data associated with one or more second groups of packets to be encoded at a particular bitrate based on the available network path capacity.

* * * * *